United States Patent
Mackowiak et al.

(10) Patent No.: US 10,348,161 B2
(45) Date of Patent: Jul. 9, 2019

(54) HYBRID MODULE AND POWER ELECTRONICS MODULE WITH A SHARED COOLING STREAM

(71) Applicant: Schaeffler Technologies AG & Co. KG, Herzogenaurach (DE)

(72) Inventors: Stefan Mackowiak, Malsch (DE); Cedric Blaes, Munchhausen (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 273 days.

(21) Appl. No.: 15/038,978

(22) PCT Filed: Nov. 19, 2014

(86) PCT No.: PCT/DE2014/200648
§ 371 (c)(1),
(2) Date: May 24, 2016

(87) PCT Pub. No.: WO2015/078465
PCT Pub. Date: Jun. 4, 2015

(65) Prior Publication Data
US 2016/0380515 A1     Dec. 29, 2016

(30) Foreign Application Priority Data

Nov. 26, 2013   (DE) .................. 10 2013 224 086

(51) Int. Cl.
*H02K 9/19*      (2006.01)
*B60K 1/00*      (2006.01)
(Continued)

(52) U.S. Cl.
CPC .............. *H02K 9/19* (2013.01); *B60K 1/00* (2013.01); *B60K 6/26* (2013.01); *B60K 6/405* (2013.01);
(Continued)

(58) Field of Classification Search
CPC . H02K 5/22; H02K 9/19; H02K 11/33; H02K 2209/00; B60K 1/00; B60K 6/26;
(Continued)

(56) References Cited

U.S. PATENT DOCUMENTS

| | | | | |
|---|---|---|---|---|
| 4,711,204 A | * | 12/1987 | Rusconi .................. | F01P 3/20 122/26 |
| 6,323,613 B1 | * | 11/2001 | Hara ...................... | B60K 6/26 165/299 |

(Continued)

FOREIGN PATENT DOCUMENTS

| | | |
|---|---|---|
| CN | 101573856 | 11/2009 |
| DE | 102012222110 | 6/2013 |

(Continued)

*Primary Examiner* — Bernard Rojas
*Assistant Examiner* — Rashad H Johnson
(74) *Attorney, Agent, or Firm* — Davidson, Davidson & Kappel, LLC

(57) ABSTRACT

A hybrid module for a hybrid drive unit, where the hybrid module may have a stream of coolant flowing through it, which also flows through a power electronics module for operating the hybrid module is provided. A power electronics module and to a method for installing a hybrid module is also provided.

12 Claims, 2 Drawing Sheets

(51) Int. Cl.
*H02K 11/33* (2016.01)
*B60K 6/26* (2007.10)
*B60K 6/405* (2007.10)

(52) U.S. Cl.
CPC ........ *H02K 11/33* (2016.01); *B60K 2001/006* (2013.01); *B60Y 2200/92* (2013.01); *B60Y 2306/05* (2013.01); *B60Y 2410/10* (2013.01); *H02K 2209/00* (2013.01); *Y10S 903/906* (2013.01); *Y10S 903/952* (2013.01)

(58) Field of Classification Search
CPC .............. B60K 6/405; B60K 2001/006; B60Y 2200/92; B60Y 2306/05; B60Y 2410/10; Y10S 903/906; Y10S 903/952
USPC .................... 310/54, 57, 58, 64, 89
See application file for complete search history.

(56) References Cited

U.S. PATENT DOCUMENTS

| | | | | |
|---|---|---|---|---|
| 7,207,187 B2* | 4/2007 | Funahashi | ............... | F01C 21/10 62/113 |
| 7,462,963 B2* | 12/2008 | Ishihara | ................... | H02K 9/20 310/52 |
| 7,473,080 B2* | 1/2009 | Kawada | .................. | F04B 35/04 417/423.14 |
| 7,977,830 B2 | 7/2011 | Yoshida et al. | | |
| 8,148,859 B2* | 4/2012 | Yoshida | .................... | H02K 5/20 310/52 |
| 9,180,866 B2 | 11/2015 | Helmer et al. | | |
| 2004/0109772 A1* | 6/2004 | Ogawa | .................... | F01C 21/10 417/410.5 |
| 2010/0127583 A1 | 5/2010 | Yoshida et al. | | |
| 2011/0169352 A1* | 7/2011 | Nagao | ...................... | H02K 5/20 310/59 |
| 2013/0049495 A1* | 2/2013 | Matsuo | ..................... | H02K 5/20 310/53 |
| 2014/0300221 A1* | 10/2014 | Linnemann Nielsen | | .................... H02K 5/225 310/54 |
| 2014/0306563 A1* | 10/2014 | Oyama | .................. | H02M 1/12 310/71 |
| 2016/0268867 A1* | 9/2016 | Mackowiak | ........... | H02K 5/225 |

FOREIGN PATENT DOCUMENTS

| | | |
|---|---|---|
| EP | 1000790 | 5/2000 |
| EP | 1049235 | 11/2000 |
| EP | 2520452 | 11/2012 |
| JP | 2010213447 | 9/2010 |

\* cited by examiner

HYBRID MODULE AND POWER ELECTRONICS MODULE WITH A SHARED COOLING STREAM

The invention relates to a power electronics module and a hybrid module for hybrid-drive machines, in particular for vehicles with hybrid drive, which have a combination of electric motor and internal combustion engine.

BACKGROUND

The valuable contribution to the prior art, DE 10 2012 222 110 A1, shows a clutch device having an actuating device for a drivetrain of a motor vehicle having an internal combustion engine, an electric machine with a stator and a rotor, and a transmission device, wherein the clutch device is situated in the drivetrain between the internal combustion engine on the one side and the electric machine and the transmission device on the other side, the clutch device and the actuating device being integrated into the rotor of the electric machine, in order to improve the construction and/or the function of the clutch device.

SUMMARY OF THE INVENTION

The inventors have set themselves the object of improving the existing state of the art still further. In particular, costs and/or assembly expense are to be reduced and/or operating reliability increased.

The present invention provides a hybrid module for a hybrid drive unit, where the hybrid module can have a stream of coolant flowing through it, which preferably also can flow through a power electronics module for operating the hybrid module.

The present invention also additionally provides a power electronics module for operating the hybrid module, where the power electronics module can have a stream of coolant flowing through it, which preferably also can flow through the hybrid module.

The present invention also provides a method for installing a hybrid module for a hybrid drive unit, characterized in that a power electronics module is connected to the hybrid module (preferably hydraulically, preferably by means of a cooling line and/or a hose and/or conduit and/or coolant connections), is preferably located on the hybrid module, and at the same time a flow guide, preferably a flow conduit, of a coolant is formed, which guides a stream of coolant through both modules.

This makes it possible to use the same stream of coolant for cooling in two modules. Furthermore, separate coolant streams for the hybrid module and the power electronics module are avoided, which saves costs, reduces assembly expense and increases reliability (fewer hoses or conduits need to be run). This makes it possible in particular to save costs with regard to additional hoses, clamps, connectors, etc.

Whenever a module is mentioned without further identification, it can be understood to mean either the hybrid module or the power electronics module, or both modules.

"On the hybrid module" preferably means that in reference to the interface between hybrid module and power electronics module, the component so identified is located on the hybrid module, and that it is assigned in that respect to the hybrid module. "On the power electronics module" preferably means that in reference to the interface between hybrid module and power electronics module, the component so identified is located on the power electronics module, and that it is assigned in that respect to the power electronics module.

A hybrid module is preferably a coupling module which, as an electric drive unit, contains an e-motor (electric motor) and preferably a clutch, preferably a decoupling clutch, by particular preference having an additional damper system. It is preferably positioned axially between an internal combustion engine and the output side, e.g., wheels, preferably with a transmission interposed between the hybrid module and the output side. The hybrid module is preferably a motor vehicle hybrid module. The hybrid module preferably has a hybrid module housing. A hybrid module housing is preferably an enclosure which at least partially surrounds the electric drive unit and/or at least partially surrounds the clutch of the hybrid module. By particular preference, the hybrid module housing encloses the electric drive unit and/or the clutch, sealing them against a fluid such as cooling fluid. There are preferably one or more cooling fluid conduits present in the hybrid module housing in which fluid flows, preferably circulates. The hybrid module housing preferably has a first, preferably also a second opening, through which a coolant is able to flow. The hybrid module preferably has an e-motor power connection and/or an electric signal and/or clutch actuator connection and/or a coolant connection, where at least one, preferably two, by particular preference all of these connections are directly connected to a corresponding connection on the power electronics module. For example, the e-motor power connection, preferably also the electric signal and/or clutch actuator connection, by particular preference also the coolant connection, are directly connected to a corresponding connection on the power electronics module.

A hybrid drive unit is preferably a combined drive unit having two different drive units, for example an internal combustion engine and an electric motor.

A power electronics module is preferably a composite of various components which control or regulate electric current to the e-motor of the hybrid module, preferably including requisite components such as cooling elements or power supply units. In particular, the power electronics module contains power electronics, or one or more power electronics components which are set up to control or regulate an electric current. By particular preference, these are one or more power switches, for example power transistors. By particular preference, the power electronics unit has more than two, by particular preference three mutually separate phases or current paths, each having at least one power electronics component of its own. The power electronics system is preferably designed to control or regulate power for each phase having a peak power, preferably continuous power, of at least 10 W, preferably at least 100 W, by particular preference at least 1000 W. The power electronics module is preferably located on a component of the hybrid module, for example on the hybrid module housing, preferably on a component of the hybrid module located in the hybrid module housing, such as a stator sheet. The power electronics module is preferably pre-mounted on the component of the hybrid module before installing the hybrid module in the hybrid drive unit, for example before installing the hybrid module in the motor area of a motor vehicle. The power electronics module preferably has a power electronics housing, which completely or at least partially encloses the power electronics and preferably additional electronics. The power electronics housing preferably has a first and preferably also a second opening, through which a coolant is able to flow. The second opening is preferably separated from the first opening by more than half an extent of the power electronics housing. The power electronics module preferably has a cooling device which is coupled thermally with an electronics element.

The power electronics module preferably has additional control electronics and/or sensor electronics for the hybrid module, such as a control device (for example an ACU—actuator control unit) for the clutch actuator, for example an electric central clutch release. The power electronics module preferably has an electric signal and/or clutch actuator connection and/or a coolant connection, each of which is connected directly to a corresponding connection on the hybrid module.

The hybrid module is operable by means of the power electronics module, preferably by the power electronics module conducting electric current into the hybrid module, for example at a stator winding of the e-motor.

The hybrid module is preferably connectible to the power electronics module, or vice versa, by means of a conduit and/or hose. The hybrid module and the power electronics module are preferably set up to guide at least one shared coolant stream, for example by means of at least one conduit and/or hose, by means of which the hybrid module and the power electronics module are connectible or connected. They preferably have one shared cooling circuit.

A flow guide preferably guides a coolant in predetermined directions. It is, for example, a coolant line, a conduit, a hose or a conduit and/or hose system.

A coolant or cooling medium is, for example, water, cooling fluid or air. A coolant stream is preferably a coolant circuit.

Capable of flow-through, or flowing through, preferably means that the coolant flows into the module at one point (for example an opening), and at another point (for example another opening) flows out or can flow out of the model. An outlet of the one module is preferably connectible to the inlet of the other model for this purpose.

In another hybrid module according to the invention, the hybrid module has a coolant connection on the hybrid module that conducts the coolant stream, for direct connection to a coolant connection on the power electronics module, which is present on the power electronics module. In another power electronics module according to the invention, the power electronics module has a power electronics module coolant connection that conducts the coolant stream, for direct connection to a hybrid module coolant connection, which is present on the hybrid module. In another method according to the invention, a power electronics module coolant connection is connected directly to a hybrid model coolant connection, which is present on the hybrid module.

This provides a direct connection possibility between the modules, in order to transfer coolant deliberately from one module to the other, which is in particular again more cost-effective, simpler to install and more reliable.

A coolant connection is preferably located on an outer surface of a housing of the module. It preferably has an opening in the housing of the module at the point where the coolant connection is attached, by particular preference a sealing element which encircles the opening. The coolant connection preferably has a component surrounding the opening, protruding from the housing of the module (preferably protruding more than 0 mm, especially more than 5 mm, by particular preference more than 10 mm), for example a chimney, a piece of pipe or a pipe-like component, or a pipe connector. The component preferably has conical sections and/or one or more grooves, which improve the connection quality (e.g., tightness of seal, strength). It is preferably attached to the housing, for example by screwing, bonding or welding, or is cast in place. For example, a pipe connector is cast onto the hybrid module housing. The module preferably has two or more coolant connections, it being possible for coolant to flow into the module in at least one coolant connection and for coolant to flow out at one coolant connection.

"For direct connection" preferably means that the attached connections or parts of the attached connections are in contact, preferably with a sealing element interposed, by particular preference exclusively with an interposed sealing element or entirely without an interposed component/element.

In another hybrid module according to the invention, the power electronics module is positionable, preferably positioned, on a component of the hybrid module, and by positioning the power electronics module on the component may be brought into, preferably is brought into contact, and preferably is engaged, with the hybrid module coolant connection. In another power electronics module according to the invention, the power electronics module is positionable, preferably is positioned, on a component of the hybrid module, and by positioning the power electronics module on the component may be brought into, preferably is brought into contact, preferably is engaged, with the hybrid module coolant connection. In another method according to the invention, by positioning the power electronics module on the component the power electronics module coolant connection is brought into contact, preferably into engagement with the hybrid module coolant device.

This makes easy assembly and a reliable connection possible. In addition, the stability of the connection between the hybrid module and power electronics module is preferably increased by the mutual engagement, for example when the coolant connection is designed as a plug-in device. A plug-in device preferably forms a plug connection. A plug-in device preferably has at least one plug element and/or at least one jack element. The power electronics module is preferably positioned on the hybrid module, so that there is a mutual engagement of at least two coolant connections (one connection per module). One component of the hybrid module on which the power electronics module is positioned is for example the hybrid module housing, preferably a component of the hybrid module located in the hybrid module housing, for example a stator sheet.

In another hybrid module according to the invention, the hybrid module coolant connection has an opening in the hybrid module housing and a pipe connector surrounding the opening. In another power electronics module according to the invention, the power electronics coolant connection has an opening in the power electronics housing and a pipe connector surrounding the opening. In another method according to the invention, a pipe connector of a hybrid module which surrounds an opening in the hybrid module housing is brought into contact with an opening in a power electronics housing or with a pipe connector which surrounds this opening, preferably by means of a sealing element, or a pipe connector of a power electronics module which surrounds an opening in the power electronics housing is brought into contact with an opening in a hybrid module housing or with a pipe connector which surrounds this opening on the hybrid module, preferably by means of a sealing element.

This makes a simple and readily sealable connection of two coolant connections of different modules possible. In a preferred use of two pipe connectors (one pipe connector on the hybrid module, another on the power electronics module), there is in addition an advantageous guide in the contacting, as well as preferably a mutual engagement and the formation of a plug connection. In this case, the one pipe connector has a larger inside circumference than the outside circumference of the other pipe connectors, so that the pipe connectors can engage with each other.

Preferably, instead of a pipe connector, a (different) component which surrounds the opening and protrudes out of the housing of the module is used, for example a chimney, a piece of pipe or a pipe-like component, preferably having conical sections.

A preferred sealing element is, for example, a rubber coating or a sealing ring, a sealing sleeve or a sealing lip. The sealing of the transfer point is preferably carried out radially and/or axially (relative to the rotor axis).

The transfer of the cooling medium is preferably carried out in the manner that a cooling device of the power electronics module contains a chimney which is inserted into a pipe piece or a type of pipe piece on the hybrid module housing when the modules are being assembled.

In another hybrid module according to the invention, the hybrid module has a second hybrid module coolant connection which is located at a distance from the first coolant connection equal to or less than a fourth of the circumference of the hybrid module.

This causes the coolant connections to be close together, which can be utilized to save space. For example, the coolant connections are positioned at an offset from each other equal to or less than 90°, especially preferably less than 45°, by particular preference less than 20° or even without any offset relative to an axis (for example the rotor axis), preferably a center axis, i.e., preferably an axis through a center point of the hybrid module. The distance between the coolant connections preferably relates to a path along the circumference of the hybrid module.

A circumference is preferably an imaginary line having a common ending and starting point, which leads around an axis running through the center point of the hybrid module along the surface of the hybrid module, or along the surface of a component of the hybrid module on which the coolant connections are located.

The hybrid module preferably has in the housing a flow guide or guide for the coolant (for example a conduit or a coolant line), which guides the coolant along a path that is longer than a quarter, preferably a half, by particular preference three-quarters of the circumference, preferably along a path that passes around the center point of the hybrid module or a central axis of the hybrid module, through an angle range equal to or more than 90°, preferably 180°, by particular preference 270°. An angle range is preferably enclosed by an angle opening around the axis between the beginning and end of the guide for the coolant.

For example, the coolant connection is located directly next to the second coolant connection in the cooling conduit, so that the cooling medium can flow around the e-motor one time. Preferably there is an existing conduit for stator cooling, which carries fluid on the longer path of two possible connecting paths between the coolant connections around the stator.

In another hybrid module according to the invention, the hybrid module has a second coolant connection on the hybrid module, which is located at a distance of more than a fourth of the circumference of the hybrid module away from the first coolant connection.

This causes the coolant connections to be farther apart, which results in especially favorable flow conditions within the hybrid module.

For example, the coolant connections are positioned at an offset from each other of more than 90°, especially preferably more than 135°, by particular preference equal to 180° relative to an axis (for example the rotor axis), preferably a center axis, i.e., preferably an axis through a center point of the hybrid module. The distance between the coolant connections preferably relates to a path along the circumference of the hybrid module.

The hybrid module preferably has in the housing a guide for the coolant (for example, a conduit), which carries the coolant along two paths, both paths being equal in length or one path being longer than the other. On the one path, an encircling flow in the clockwise direction takes place, on the other path, a counterclockwise flow. The guide for the coolant preferably has a branching fork at the coolant connection which serves as an inlet, and a merging fork at the coolant connection which serves as an outlet.

For example, two conduits are present for stator cooling, which lead around the stator from the inlet to the outlet in different encircling directions.

In another hybrid module according to the invention, the power electronics module, preferably a power electronics module according to the invention, is positioned, preferably fastened, on the hybrid module, and the hybrid module and the power electronics module can have, preferably do have the same coolant stream flowing through them. In another power electronics module according to the invention, the hybrid module, preferably a hybrid module according to the invention, is positioned, preferably fastened, on the power electronics module, and the hybrid module and the power electronics module can have, preferably do have the same coolant stream flowing through them. In another method according to the invention, the power electronics module, preferably a power electronics module according to the invention, is positioned, preferably fastened, on the hybrid module, so that the hybrid module and the power electronics module can have, preferably do have the same coolant stream flowing through them.

The power electronics module is preferably located beneath the hybrid module. This promotes transporting of the coolant (for example in the case of air), since heated coolant rises. Advantageously, an inlet into the power electronics is present in the common coolant circuit, preferably located below, since this produces a greater power loss. The transfer of the coolant from the power electronics module to the e-motor preferably takes place in the lower region of the hybrid module.

In another hybrid module according to the invention the hybrid module has a hybrid module coolant connection as a hybrid module inlet and a second hybrid module coolant connection as a hybrid module outlet, and the power electronics module has a power electronics module coolant connection as a power electronics module outlet and a second power electronics module coolant connection as a power electronics module outlet, and the power electronics module outlet is connected to the hybrid module inlet, preferably directly.

This causes the power electronics module, in which a greater power loss is usually produced and must be dispersed, to be cooled better. The outlet of the power electronics module is preferably located on the top of the power electronics module. The inlet of the power electronics module is preferably located on the front face or bottom of the power electronics module. The outlet of the hybrid module is preferably located on the top of the hybrid module. The inlet of the hybrid module is preferably located on the front face or bottom of the hybrid module.

BRIEF DESCRIPTION OF THE DRAWINGS

Examples of the invention will now be illustrated on the basis of drawings.

The figures show the following.

DETAILED DESCRIPTION

Figure 1:
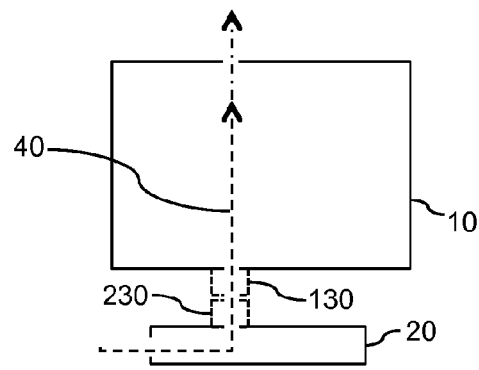
FIG. 1 a hybrid module according to the invention and a power electronics module according to the invention, through which a common coolant stream can flow, FIG. 2-FIG. 5 four variants of a hybrid module according to the invention and of a power electronics module according to the invention, building on FIG. 1, FIG. 6 a perspective view of a hybrid module according to the invention before installation, FIG. 7 a perspective view of a power electronics module according to the invention, preferably for the hybrid module according to FIG. 6.

FIG. 1 shows a hybrid module 10 according to the invention and a power electronics module 20 according to the invention, through which a common coolant stream 40 can flow. The preferred coolant connections 230 and 130 are drawn with dashed lines. A dashed stream 40 has a lower temperature than a dot-dashed stream 40. Also shown here is the preferred design, according to which the coolant stream 40 is guided or flows from the power electronics module 20 in the direction of the hybrid module 10, in particular from the power electronics module 20 located beneath the hybrid module 10 into the hybrid module 10.

During assembly, the power electronics module 20 is connected to the hybrid module 10, preferably positioned nearby or directly, thereby forming a guide for a coolant which guides the coolant stream 40 through both modules 10, 20.

This makes it possible to use the same coolant stream 40 for cooling in two modules 10, 20. Furthermore, separate coolant streams for the hybrid module 10 and the power electronics module 20 are avoided, which saves costs, reduces assembly expense and increases reliability (fewer hoses or conduits need to be run). The flow-through sequence chosen here causes the power electronics module 20, in which a greater power loss is usually produced and must be dispersed, to be cooled better. In particular, positioning the power electronics module 20 underneath produces an advantageous flow into the hybrid module 10.

FIG. 2-FIG. 5 show four variants of a hybrid module according to the invention and of a power electronics module according to the invention, building on FIG. 1.

Figure 2:
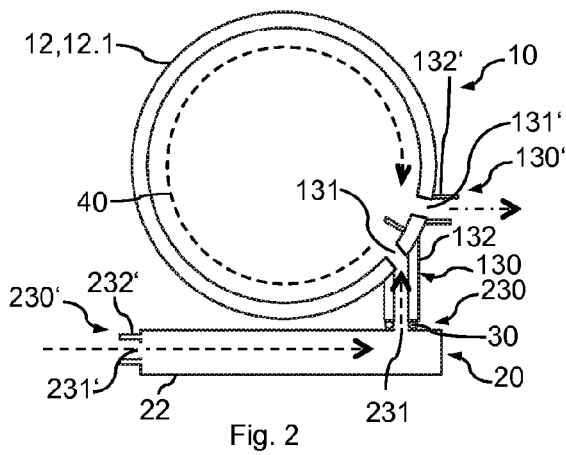

In FIG. 2, the hybrid module 10 has a hybrid module coolant connection 130 located in the lower third of the hybrid module 10 and directed downward as a hybrid module inlet, and a second coolant connection 130' located in the lower half of the hybrid module 10 and directed to the side as a hybrid module outlet. The power electronics module 20 has a power electronics module coolant connection 230 located on its top and directed upward as a power electronics module outlet, and a second power electronics module coolant connection 230' located on its front face and directed to the side as a power electronics module outlet. The power electronics module outlet is connected to the hybrid module inlet through an encircling sealing element 30. The sealing element 30 seals axially. The second hybrid module coolant connection 130' is positioned at a distance of less than a quarter of the circumference of the hybrid module 10 from the first coolant connection 130. The power electronics module 20 has a power electronics housing 22, the hybrid module 10 a hybrid module housing 12.1 as component 12. The coolant connections 130, 130', 230, 230' each have a housing opening 131, 131', 231, 231' of the housing 12.1, 22 of the corresponding module 10, 20, or are positioned at such an opening. The coolant connections 130, 130', 230' each have pipe connectors 132, 132', 232'. The sealing element 30 borders the opening 231.

For assembly, the opening 231 of the power electronics module 20 is brought into contact with the pipe connector, the sealing element 30 having been placed between them previously. During operation of the hybrid module 10, a flow occurs around the center point of the hybrid module along an angular range of nearly 360°, in this case in the clockwise direction.

In this example, the coolant connections 131 and 131' are close together, which can be utilized to save space. There is a simple and readily sealable connection of two coolant connections 130, 230 of different modules 10, 20.

Figure 3:
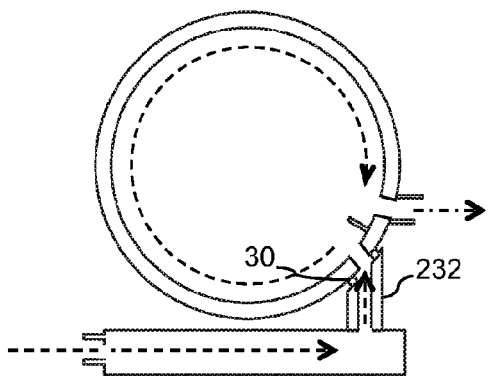

In FIG. 3, in contrast to FIG. 2, the power electronics module coolant connection 230 has a pipe connector, which is in contact with the hybrid module housing 12.1 around the opening 131 through a sealing element 30. The hybrid module coolant connection 130 no longer has the pipe connector 132. For the other components, the reference symbols which are shown already in FIG. 2 have been omitted for the sake of greater clarity.

This is a structural variant which may be advantageous, depending on construction space or assembly options.

Figure 4:
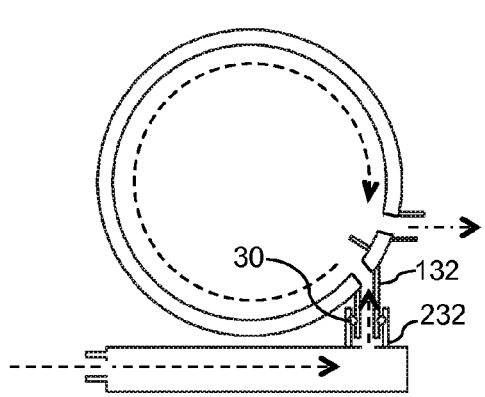

In FIG. 4, in contrast to FIGS. 2 and 3, both the power electronics module coolant connection 230 and the hybrid module coolant connection have pipe connectors 232, 132, which are in contact with each other through a sealing element 30. The sealing element 30 seals radially. The pipe connectors 232, 132 engage with each other. They form a plug contact; each pipe connector 232, 132 forms a plug-in device.

This makes it possible to equal out the tolerances, since the sealing works even when the two modules are pushed together. Coolant connections 232, 132 that are located farther apart are also possible with the sealing variants in FIGS. 2 and 3.

Figure 5:
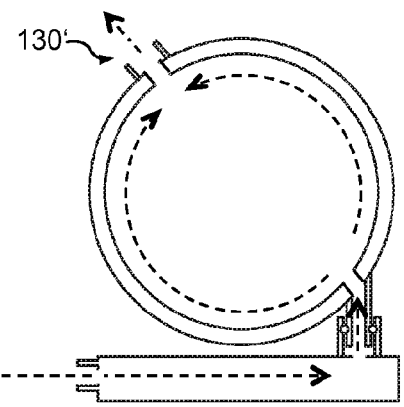

In FIG. 5, in contrast to FIGS. 2-4, the second hybrid module coolant connection 130' is positioned at a distance of more than a quarter of the circumference of the hybrid module 10 from the first coolant connection 130. The coolant connections 130 and 130' are located opposite each other at around 180°.

This causes the coolant connections 130, 130' to be farther apart, which results in especially favorable flow conditions within the hybrid module. Two streams form, one of which flows counterclockwise through the hybrid module and the other clockwise.

Figure 6:
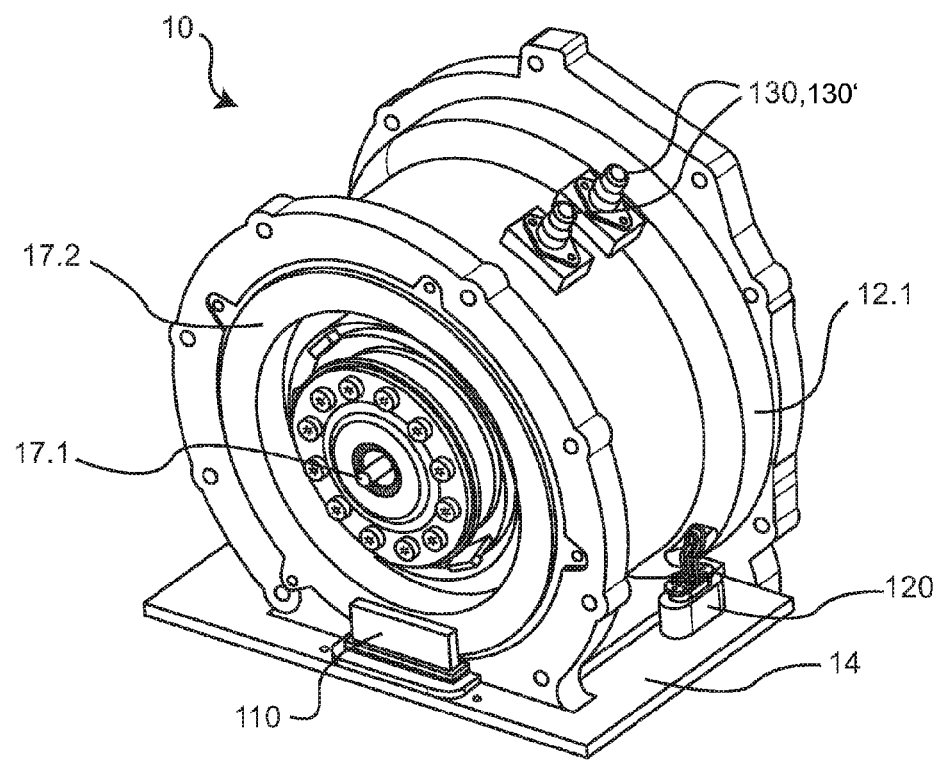

FIG. 6 shows a perspective view of a hybrid module 10 according to the invention, building on FIG. 1 or another of the previous figures, prior to assembly. Connections sealed from the interior of the hybrid module are provided on the wall area 14: a hybrid module e-motor flow connection 110 and a hybrid module electric signal and/or clutch actuator connection 120. Furthermore, the hybrid module 10 has two hybrid module coolant connections 130, 130'. In addition, the rotor 17.1 and the stator 17.2 of the hybrid module are also shown in this figure.

Figure 7:
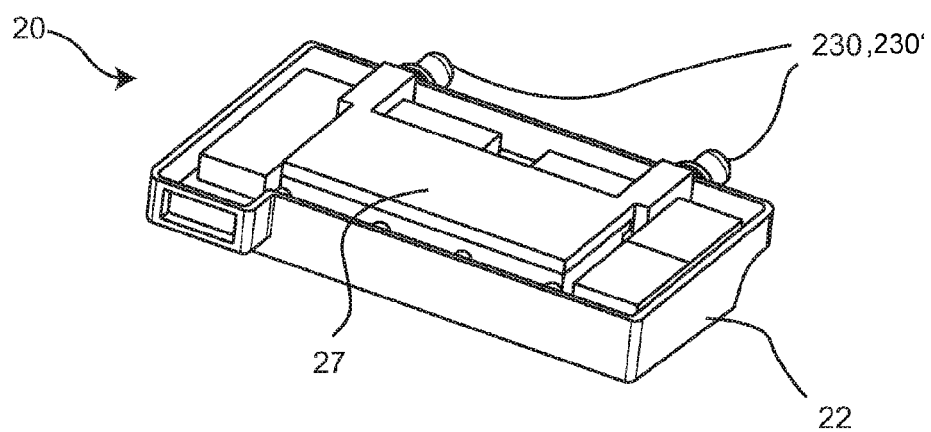

Also positionable in a simple manner on this hybrid module 10, radially outside of the rotor 17.1 and stator 17.2, is a power electronics module 20, for example the one shown in previous figures or in FIG. 7, saving space.

FIG. 7 shows a perspective view of a power electronics module 20 according to the invention, building on FIG. 1 or another of the previous figures, preferably for the hybrid module 10 according to FIG. 6 prior to assembly. It has a cooling device 27, which is positioned between two cooling connections 230, 230' inside the power electronics housing 22, on a side of a circuit board facing the hybrid module. The power electronics are covered up by the cooling device 27.

The present invention relates to the cooling of a power electronics module and a hybrid module. A shared coolant stream, in particular a circuit, is proposed, which is particularly advantageous in the case of a direct tie-in of the power electronics module to the hybrid module. The power electronics housing has an inlet and an outlet for the cooling medium for this purpose. The hybrid module likewise has an inlet and an outlet. The input of the hybrid module and the output of the power electronics module are coupled with each other. The following two variants are preferred for this: Inlet and outlet are inserted one into the other and lie coaxially, there being a) a radial seal provided between them, and/or
b) an axial seal being provided on one side or the other.

Two variants are preferred for the coolant conduit inside the hybrid module:

i) inlet and outlet are separated 180° (the cooling medium flows in both directions), or
ii) inlet and outlet are nearly side-by-side (the cooling medium flows almost completely around the hybrid module in its interior).

REFERENCE LABELS 10 hybrid module
12.1 hybrid module housing
14 wall region of the component
17.1 rotor
17.2 stator
20 power electronics module
22 power electronics housing
27 cooling device
30 sealing element
40 coolant stream
110 hybrid module e-motor power connection
120 hybrid module electric signal and/or clutch actuator connection
130 hybrid module coolant connection
130' second hybrid module coolant connection
131 opening
131' second opening
132 pipe connector
132' second pipe connector
230 power electronics module coolant connection
230' second power electronics module coolant connection
231 opening
231' second opening
232 pipe connector
232' second pipe connector

What is claimed is:

1. A hybrid module for a hybrid drive unit, comprising:
a hybrid module housing; and
a power electronics module for operating the hybrid module, the hybrid module housing and the power electronics module connected together such that a coolant stream flowable through the hybrid module is also flowable through the power electronics module, the power electronics module being offset radially outside the hybrid module housing, the hybrid module housing having a hybrid module coolant connection extending radially outward from an outer circumferential surface of the hybrid module housing, the hybrid module coolant connection connecting directly to a power electronics module outlet coolant connection of the power electronics module to conduct the coolant stream between the power electronics module and the hybrid module housing through the power electronics module outlet coolant connection,
the power electronics module being positioned beneath the hybrid module housing, the power electronics module including the power electronics module outlet coolant connection on a top of the power electronics module and a power electronics module inlet coolant connection on a side of the power electronics module such that the coolant stream flows in through the side of the power electronics module and upward out through the top of the power electronics module.

2. The hybrid module as recited in claim 1 wherein the power electronics module is positionable on a component of the hybrid module, and by positioning the power electronics module on the component the power electronics module outlet coolant connection is bringable into the hybrid module coolant connection.

3. The hybrid module as recited in claim 1 wherein the hybrid module coolant connection has an opening in the hybrid module housing and a pipe connector surrounding the opening.

4. The hybrid module as recited in claim 1 wherein the hybrid module has a second module coolant connection located at a distance equal to or less than a fourth of the circumference of the hybrid module away from the hybrid module coolant connection.

5. The hybrid module as recited in claim 1 wherein the hybrid module has a second hybrid module coolant connection located at a distance of more than a fourth of the circumference of the hybrid module away from the hybrid module coolant connection.

6. The hybrid module as recited in claim 1 wherein the power electronics module is positioned on the hybrid module to have the coolant stream flowing through the power electronic module and the hybrid module.

7. The hybrid module as recited in claim 6 wherein the hybrid module has the hybrid module coolant connection as a hybrid module inlet and a second hybrid module coolant connection as a hybrid module outlet, and wherein the power electronics module outlet coolant connection is connected to the hybrid module inlet.

8. The hybrid module as recited in claim 1 wherein the power electronics module outlet coolant connection is connected to the hybrid module coolant connection such that the coolant stream is directed by the hybrid module coolant connection circumferentially around a center point of the hybrid module in an annular range.

9. A power electronics module for operating a hybrid module, the hybrid module including a hybrid module coolant connection extending radially outward from an outer circumferential surface of a hybrid module housing of the hybrid module, the power electronic module comprising:
power electronics;
a housing surrounding the power electronics;
a cooling device;
at least one inlet coolant connector connected to the cooling device; and
an outlet coolant connector connected to the cooling device and for connecting to the hybrid module, a coolant stream being flowable through the power electronics module via the coolant device and flowable into the hybrid module via the outlet coolant connector, the at least one inlet coolant connector positioned on a side of the housing, the outlet coolant connector positioned on top of the housing, the outlet coolant connector protruding away from the housing and being directly connectable to the hybrid module coolant connection to conduct the coolant stream between the power electronics module and the hybrid module housing through the power electronics module coolant connection, the power electronics module configured for being positioned beneath the hybrid module housing such that the coolant stream flows in through the side of the housing and upward out through the top of the housing.

10. A method for installing a hybrid module for a hybrid drive unit, the method comprising:

connecting a power electronics module radially outside of the hybrid module to the hybrid module, a flow guide for a coolant being formed thereby to guide a coolant stream through the power electronics module and radially into the hybrid module, the hybrid module including a hybrid module housing having a hybrid module coolant connection extending radially outward from an outer circumferential surface of the hybrid module housing, the connecting of the power electronics module to the hybrid module including directly connecting the hybrid module coolant connection to a power electronics module outlet coolant connection of the power electronics module to conduct the coolant stream between the power electronics module and the hybrid module housing through the power electronics module coolant connection, the power electronics module being positioned beneath the hybrid module housing, the power electronics module including the power electronics module outlet coolant connection on a top of the power electronics module and a power electronics module inlet coolant connection on a side of the power electronics module such that the coolant stream flows in through the side of the power electronics module and upward out through the top of the power electronics module.

11. The method as recited in claim 10 further comprising positioning the power electronics module underneath the hybrid module.

12. The method as recited in claim 10 wherein the connecting of the power electronics module to the hybrid module includes connecting the power electronics module outlet coolant connector to the hybrid module coolant connector such that the coolant stream is directed by the hybrid module coolant connector circumferentially around a center point of the hybrid module in an annular range.

* * * * *